(12) United States Patent
Joho

(10) Patent No.: US 7,271,515 B2
(45) Date of Patent: Sep. 18, 2007

(54) GAS-COOLED ELECTRICAL MACHINE WITH PRESSURE CHARGING

(75) Inventor: Reinhard Joho, Rombach (CH)

(73) Assignee: Alstom Technology Ltd., Baden (CH)

( * ) Notice: Subject to any disclaimer, the term of this patent is extended or adjusted under 35 U.S.C. 154(b) by 165 days.

(21) Appl. No.: 11/141,156

(22) Filed: May 31, 2005

(65) Prior Publication Data

US 2006/0024157 A1   Feb. 2, 2006

(30) Foreign Application Priority Data

Jun. 1, 2004   (DE) .................... 10 2004 026 633

(51) Int. Cl.
*H02K 9/04* (2006.01)
*H02K 9/06* (2006.01)

(52) U.S. Cl. .................... 310/61; 310/58; 310/60 R; 415/116

(58) Field of Classification Search .................. 310/58, 310/60 R, 61
See application file for complete search history.

(56) References Cited

U.S. PATENT DOCUMENTS

| | | | | |
|---|---|---|---|---|
| 2,451,219 A | * | 10/1948 | Holmgren | 310/58 |
| 3,163,789 A | * | 12/1964 | Rosenberg | 310/53 |
| 3,225,231 A | * | 12/1965 | Kudlacik | 310/64 |
| 3,363,419 A | * | 1/1968 | Wilde | 60/226.1 |
| 3,454,802 A | * | 7/1969 | Hasitsch | 310/227 |
| 3,816,751 A | | 6/1974 | Jampen et al. | 290/2 |
| 5,557,153 A | * | 9/1996 | Zimmermann | 310/56 |
| 6,340,853 B1 | * | 1/2002 | Kaiho et al. | 310/61 |
| 6,558,116 B2 | | 5/2003 | Baer et al. | 415/116 |

FOREIGN PATENT DOCUMENTS

| | | |
|---|---|---|
| CH | 541 890 | 9/1973 |
| EP | 1 209 802 | 5/2002 |

* cited by examiner

*Primary Examiner*—Burton Mullins
(74) *Attorney, Agent, or Firm*—Darby & Darby

(57) ABSTRACT

A gas-cooled electric machine includes a generator housing, a rotor shaft, at least one axial fan disposed on the rotor shaft inside the generator housing and having a hub, and a pressure boosting apparatus associated with the axial fan and configured to raise an absolute pressure in a generator interior. The pressure boosting apparatus has at least one flow channel between an interior of the hub and the generator interior and is at least partially delimited by the hub. A flow inlet into the flow channel and a flow outlet out of the flow channel are disposed radially at a distance with respect to each other.

16 Claims, 8 Drawing Sheets

GAS-COOLED ELECTRICAL MACHINE WITH PRESSURE CHARGING

The present invention relates to a gas-cooled electric machine, particularly to an air-cooled turbo-generator with a closed coolant circulation system, having a rotor shaft on which there is at least one axial fan inside a generator housing.

BACKGROUND

As is generally known, turbo-generators for generating three-phase current are powered by steam or gas turbines. As a rule, the rotor of a turbo-generator consists of a solid cylindrical forged body made of steel in which the excitation winding is distributed over individual slots. The rotor turns in the bore of the stator of a generator. The stator consists of a sheet metal body which, in turn, has slots to accommodate the armature winding. The decisive factor in the configuration and construction of such turbo-generators is the cooling technology, since this makes it possible to substantially raise the output. Today's turbo-generators often work with a gaseous coolant and with fans that are arranged on the rotor and that circulate the coolant inside the generator.

European patent application EP 1209802 A2 describes the arrangement of a fan in a turbo-generator with a closed cooling-gas circulation system. The cooling gas enters the axial fan from the end of the machine, undergoes a pressure increase in said fan and is thereby conveyed into the machine parts that are to be cooled. Before the cooling gas flows back into the fan, it is passed through heat exchangers.

Moreover, a few cases of air-cooled generators are known from the state of the art with which the air pressure in the generator interior is markedly raised by means of external compressors that are supplied by an external power system. Swiss patent specification CH 541 890 describes boosting the pressure of a generator in order to raise the generator output, whereby compressed air from the compressor of a gas turbine is fed into the generator housing. The low stationary replenishment volume is determined by the leakage rate of the air in the generator, essentially by the leakage volume at the place where the rotor shaft enters the housing. As a result, the volume output flow brought about by the generator ventilation remains practically unchanged. The higher air density achieved in the generator interior leads to an improvement of the cooling properties and can result in an increase in output while the temperature of the generator components remains constant. As a rule, interfaces to the power plant process-control technology are provided. The disadvantages here are the relatively high complexity and the high costs incurred for the external auxiliary devices, for the power and for the process-control technology. Moreover, such an approach is somewhat malfunction-prone.

SUMMARY OF THE INVENTION

An objective of the present invention is to provide an improved gas-cooled electric machine that avoids that above-mentioned drawbacks of the state of the art. Moreover, a marked pressure increase is to be achieved in the generator housing so as to attain improved heat dissipation and thus more effective cooling of the generator. In this context, there should be no need for additional external devices to raise the pressure or for external control devices, but rather, a simple and inexpensive solution is to be provided that is also well-suited for easily retrofitting existing generators.

The gas-cooled electric machine according to the invention, particularly a turbo-generator having a rotor shaft on which there is at least one axial fan inside a generator housing, is characterized in that a pressure boosting means is arranged on the axial fan in order to raise the absolute pressure in the generator interior, said means having one or more flow channels between the hub interior that is delimited by the hub of the axial fan and the generator interior, whereby the flow inlet and the flow outlet are radially at a distance from each other.

This approach is particularly advantageous since this results in an improved gas-cooled electric machine that avoids the above-mentioned drawbacks of the state of the art. A marked increase in the absolute pressure in the generator housing is achieved which, due to the higher density of the cooling medium, brings about improved heat dissipation and thus more effective cooling of the generator. Moreover, the pressure boosting automatically equalizes the unavoidable leakage losses. No additional external devices to raise the pressure or external control devices are needed for this purpose, but rather, only modifications to the already existing fan module, which are also suitable for easily retrofitting existing generators.

The present invention modifies the already existing axial fan with a pressure boosting means that makes use of the fact that one side of the fan hub delimits the hub interior and, via this interior, is connected to the housing exterior and thus to the ambient pressure. The pressure is then increased via the radius differential between the inlet opening of the flow channel located in the hub interior and the outlet opening located in the generator interior. The generator interior is sealed off from the ambient atmosphere and is suitable for the pressures being generated by the pressure boosting. In this context, the outlet opening lies on a radius which, measured from the shaft axis, is larger than the radius on which the inlet opening lies. The static pressure boosting can be calculated according to the known formula $$\Delta p = \rho/2 (v_{co}^2 - v_{ci}^2)$$

Here, $\Delta p$ stands for the pressure differential between the ambient atmosphere and the generator interior. $\rho$ stands for the density of the cooling gas. Moreover, $v_{co}$ stands for the circumferential speed at the outlet opening and $v_{ci}$ stands for the circumferential speed at the inlet opening. In turbo-generators, as a rule, the stationary rotational speed of the rotor shaft should be considered as given, which is why a desired pressure differential $\Delta p$ can be set by selecting the appropriate radii on which the inlet opening and the outlet opening of the flow channel are arranged. Furthermore, the number of flow channels provided on the axial fan for the pressure boosting means can vary, but as a rule, it will match or be a fraction of the number of compressor blades.

In an advantageous embodiment of the present invention, there are radial bores in the hub of the axial fan that serve as flow channels. This embodiment is a particularly simple and inexpensive variant of the present invention.

In an advantageous embodiment of the present invention, the flow at the flow outlet is deflected in the axial direction downstream from the main flow of the axial fan. In advantageous refinements of this embodiment, there are diagonal or L-shaped or Z-shaped or double-L-shaped bores in the hub of the axial fan that serve as flow channels. As a result, the flow is deflected so that the flow of the absolute pressure increase does not affect the main flow of the axial fan.

In an especially advantageous embodiment of the present invention, there is a tubular sleeve for lengthening the flow channel. Here, the flow channel can be advantageously lengthened at least to the blade height of the axial fan. The tubular sleeve can be arranged downstream as well as upstream from the blade of the axial fan. This depends, for instance, on the design of the fan hub, on the arrangement of the fan blades and on the flow conditions in each individual case.

In another advantageous embodiment of the present invention, the tubular sleeve has a streamlined jacket. The jacketed tubular sleeve can also be referred to as a streamlined additional blade, by means of which the outlet radius can be defined over the entire blade height of the axial fan through the parallel outlet with the main flow. As a result, the function of the axial fan is not impaired and it might even be improved. Depending on the embodiment, the streamlined jacketed tubular sleeve can also be configured as a streamlined body or as a radial bore made in an additional blade.

According to another particularly advantageous embodiment of the present invention, a blade bore made in the fan blade and configured as a radial channel serves as the flow channel, whereby said blade bore has a corresponding outlet opening. As a result, the influence on the main flow of the axial fan is kept to a minimum and pressure losses caused by other add-on parts are avoided. Here, depending on the construction of the fan blades, the radial bores can either be made subsequently or else they are already formed when the new fan blades are manufactured, for example, as a hollow core in the case of blades that are cast around a bolt core. In an advantageous refinement, there is at least one lateral outlet opening on the fan blade that allows a free flow out of the radial channel. The outlet opening can be configured, for example, as a recess shaped like a segment of a circle or as a semi-circular recess or else as a spherical recess. There can be several recesses on one side or on both sides of the fan blades. In the case of outlet openings on both sides, they can be arranged, for instance, alternatingly. If the outlet opening is located at the tip of the blade, the radial channel is adequately limited towards the top by the inlet opening of the axial fan, so that the flow here is deflected in the direction parallel to the axis.

In another advantageous embodiment of the present invention, there are several connecting channels leading towards the trailing edge of the blade. As a result, the main flow of the fan is minimally affected and in some cases, the flow is even enhanced.

In an advantageous embodiment of the two latter embodiments, the radial channel arranged in the fan blade is closed at the tip of the blade by means of a plug. This facilitates the production and allows the deflection of the boosting flow, even in those cases where the outlet opening is not located at the tip of the blade.

In another advantageous embodiment of the present invention, there is an axial fan with a pressure boosting means arranged at each end of the electric machine. As a result, the conveyed mass flow can be increased by the pressure boosting means if necessary.

In yet another advantageous embodiment of the present invention, the pressure boosting means is dimensioned so as to achieve a pressure differential Δp ranging from 0.1 bar to 0.5 bar, preferably from 0.2 bar to 0.3 bar. Experiments have proven that such an increase in the absolute pressure is sufficient for a marked improvement in the output of a turbo-generator.

BRIEF DESCRIPTION OF THE DRAWINGS

Advantageous embodiments of the invention are described below with reference to the accompanying drawings, which show the following.

Figure 1:
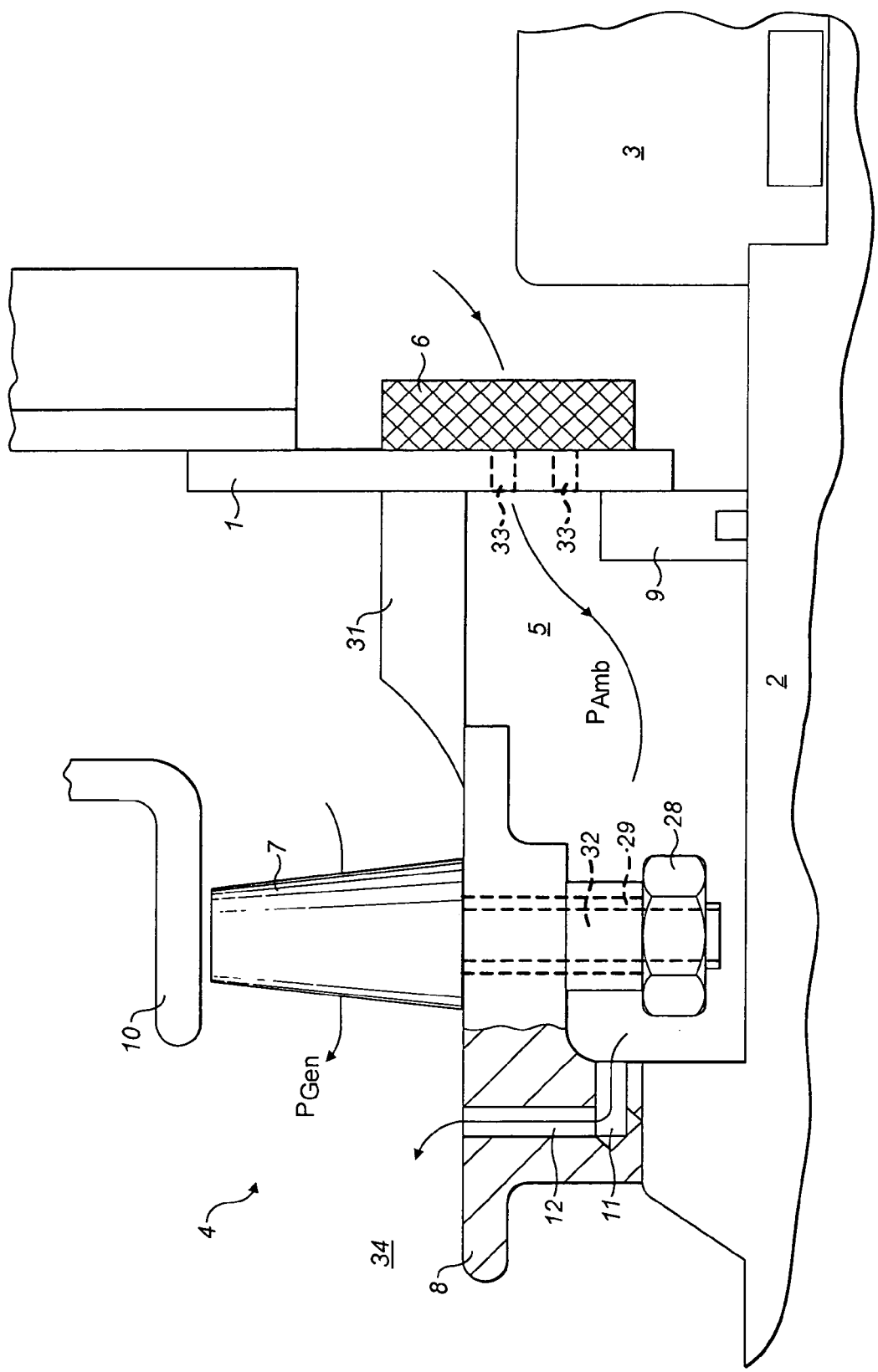
FIG. 1—a schematic partially cutaway view of a first advantageous embodiment of an axial generator with pressure boosting means according to the present invention.

Only the elements that are essential for understanding the invention are shown. In the descriptions to follow, parts that are identical or similar have been provided with the same reference numerals. As a rule, the depictions are not to scale. The directional indications "axial" and "radial" generally refer to the axis of the rotor shaft.

DETAILED DESCRIPTION

FIG. 1 shows a first advantageous embodiment of a pressure boosting means arranged on an axial fan of a gas-cooled turbo-generator, whereby FIG. 1 schematically depicts only the components that are important for the pressure boosting means.

The turbo-generator has a closed cooling circulation system. Preferably, air is employed as the cooling medium. The direction of flow of the circulated cooling medium is indicated in the figure by flow lines with directional arrows and runs in the drawing plane essentially from the right-hand side to the left-hand side. The turbo-generator has a partially depicted generator housing 1 made of sheet steel that completely accommodates the generator itself (not shown here) and the axial fan 4 provided for circulating the coolant.

Here, the axial fan 4 is arranged on a rotor shaft 2 that is mounted on shaft bearings 3 located outside of the generator housing 1. The shaft exit is sealed off from the ambient atmosphere by means of a shaft gasket 9. The axial fan 4 essentially has an encircling fan hub 8 that widens in an anvil-like manner in the radial direction and that is arranged on the rotor shaft 2, whereby several fan blades 7 that project from the fan hub 8 in the radial direction and that are arranged next to each other in the circumferential direction on the outer circumference of the fan hub are anchored by means of a blade foot 32 configured as a threaded bolt and with a spacing sleeve 29 and a screwed connection 28. Moreover, in the area of the tips of the fan blades 7, there is an annular inlet opening 10 that, in the radial direction, delimits the blade grid formed by the fan blades 7. In this context, the axial fan 4 rotates at the same rotational speed as the rotor shaft 2, that is to say, there is no separate regulation of the rotational speed of the axial fan 4 here.

Moreover, a cover ring 31 that is rigidly connected to the generator housing 1 is arranged concentrically with respect to the rotor shaft 2, whereby the side of the cover ring facing away from the generator housing 1 overlaps with part of the outer circumference of the fan hub 8. As a result, an annular space designated as the hub interior 5 is created between the cover ring 31 and the rotor shaft 2 as well as between the generator housing 1 and the fan hub 8, in which space the ambient pressure $P_{Amb}$ prevails. The generator interior 34 is sealed from the hub interior 5 during operation since the cover ring 31 forms a sealing gap with the fan hub 8.

Recesses 33 are provided on the generator housing 1 in the area of the hub interior 5, said recesses connecting the hub interior 5 to the ambient atmosphere. Moreover, there is a filter on the outside of the housing in the area of the bores 33, in the present embodiment, it is a filter fiber mat 6, which serves to prevent the penetration of dust or other dirt particles.

In FIG. 1, two additional blind holes 11, 12 are provided as the flow channel in the area of the fan hub 8, whose cross section widens in an anvil-like manner radially outwards, said blind holes connecting the hub interior 5 to the generator interior 34. Here, the first blind hole 11 that is made essentially parallel to the axial direction of the rotor shaft 2 is open towards the hub interior 5. The second blind hole 12 runs radially outwards towards the top of the fan hub 8 and it intersects with the blind hole 11 that is parallel to the axis. As a result, an L-shaped connection is established between the hub interior 5 and the generator interior 34.

These blind holes 11, 12 are distributed along the circumference of the fan hub 8, preferably in a number that matches the number of fan blades 7. In the present embodiment according to FIG. 1, the pressure boosting means is formed by the L-shaped arrangement of the two blind holes 11, 12.

During operation, due to the rotational speed of the rotor shaft 2, air in the hub interior 5 is drawn from the blind hole 11 that is open towards the annular space and this air is then conveyed into the generator interior 34 through the second blind hole 12. Since the inlet of the drawn-in ambient air, that is to say, the inlet into the blind hole 11, lies on a smaller radius of the rotor shaft axis than the outlet of the drawn-in air from the blind hole 12 on the hub top, the pressure increases here according to the known formula $$\Delta p = \rho/2(v_{co}^2 - v_{ci}^2).$$

As a result, the pressure $P_{Gen}$ in the generator interior 34 is greater by $\Delta p$ than the ambient pressure $P_{Amb}$ that prevails in the hub interior 5. Due to this rise in the absolute pressure in the generator interior 34, for example, by 0.2 bar, an increase in the cooling output and thus an overall output improvement can be achieved for air-cooled generators in a known manner. Here, the magnitude of the pressure differential between the ambient pressure and the inner pressure in the generator can be varied by appropriately selecting the radius on which the inlet bore lies as well as the radius on which the outlet bore lies. The stationary rotor speed of the generator can be assumed to be given. The mass flow can be varied as a function of the size of the diameter of the bore.

Alternative embodiments to the advantageous embodiment shown in FIG. 1 will be described below. In this context, the details that are not important for the embodiment in question have not been depicted, so that a general reference is hereby made to the depiction in FIG. 1.

Figure 2A:
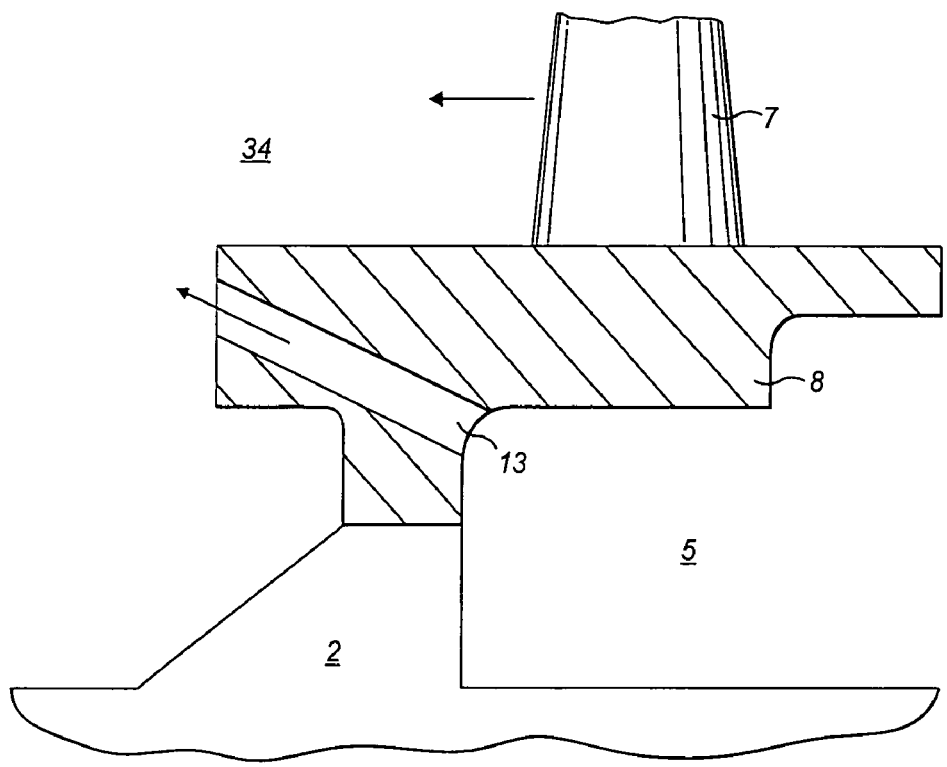
FIGS. 2a and 2b—a schematic partially cutaway view of a second and third advantageous embodiments of a pressure boosting means according to the present invention.
Figure 2B:
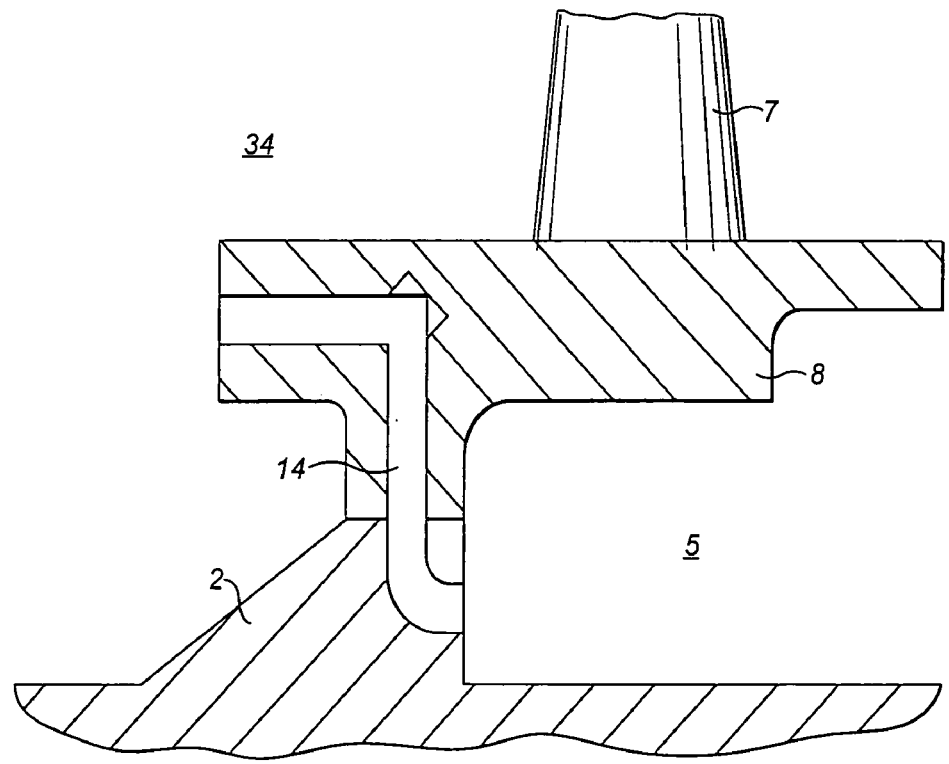

FIG. 2a shows a second advantageous embodiment of a pressure boosting means according to the invention, in which a diagonal passage bore 13 is made in the fan hub 8. As a result, the cooling air conveyed by the pressure boosting means into the generator interior 34 can flow out more favorably, which does not have negative impact on the flow coming off the fan blades 7. The same applies to the third embodiment depicted in FIG. 2b, in which there is a Z-shaped or double-L-shaped passage channel 14. Here, too, the flow is deflected, so that negative effects on the flow coming off the fan blades 7 are reduced. Here, the inlet side in the hub interior 5 lies on a smaller radius than the outlet side in the generator interior 34.

Figure 3:
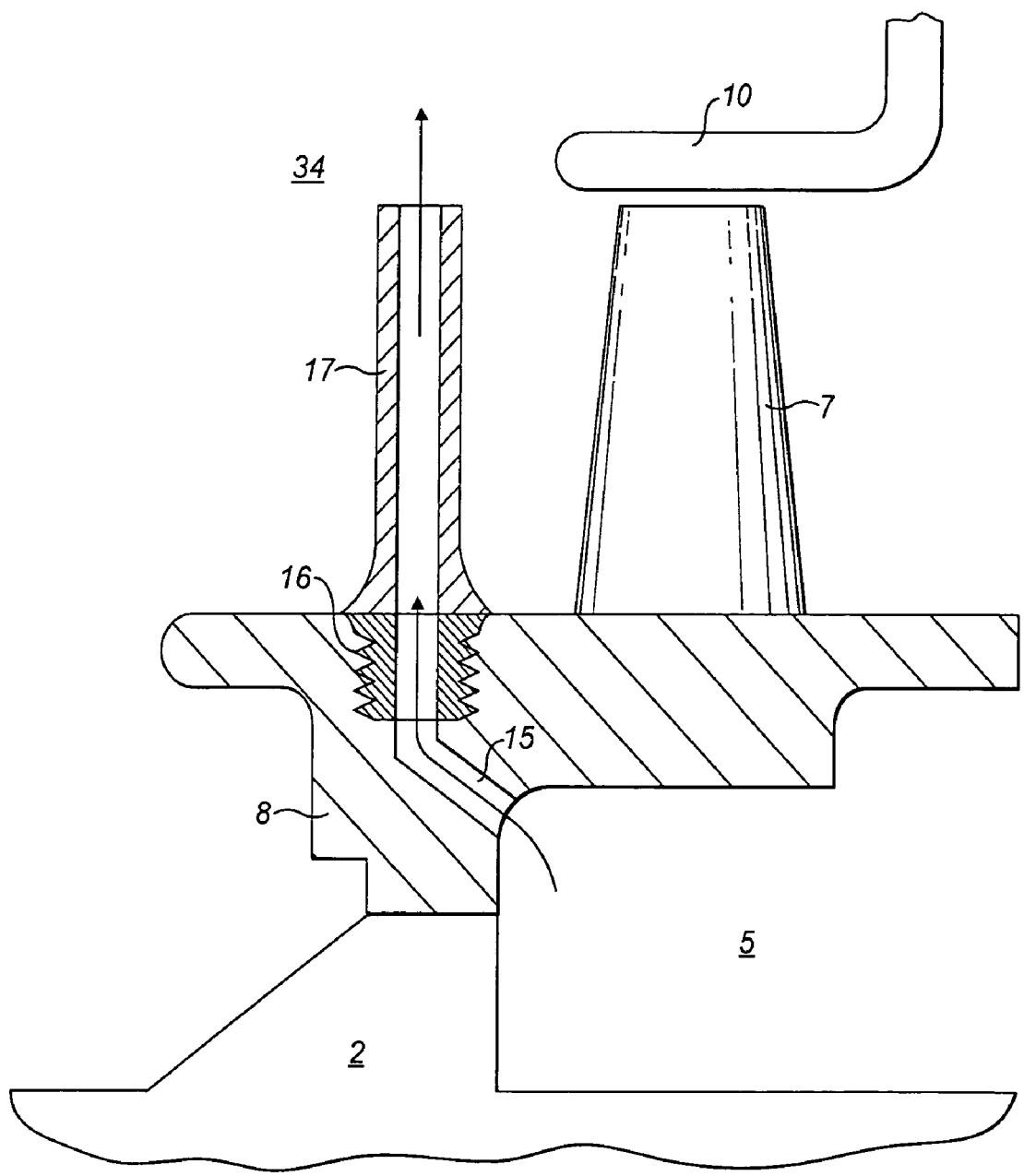
FIG. 3—a fourth advantageous embodiment of a pressure boosting means according to the present invention.

FIG. 3 shows a fourth embodiment in which the radius differential over the hub height is lengthened by means of a tubular sleeve 17 that is anchored in the fan hub 8 by means of a threaded bore 16 and that is connected to the hub interior 5 via a diagonal bore 15. In the embodiment according to FIG. 3, the tubular sleeve 17 is arranged on the trailing edge of the fan blades 7 and its height approximately matches the height of the fan blades 7. This likewise prevents disturbances on the flow coming off the fan blades 7, although the height of the tubular sleeve 17 can be varied here in such a way that the desired increase in the absolute pressure in the generator interior 34 can be achieved.

Figure 4A:
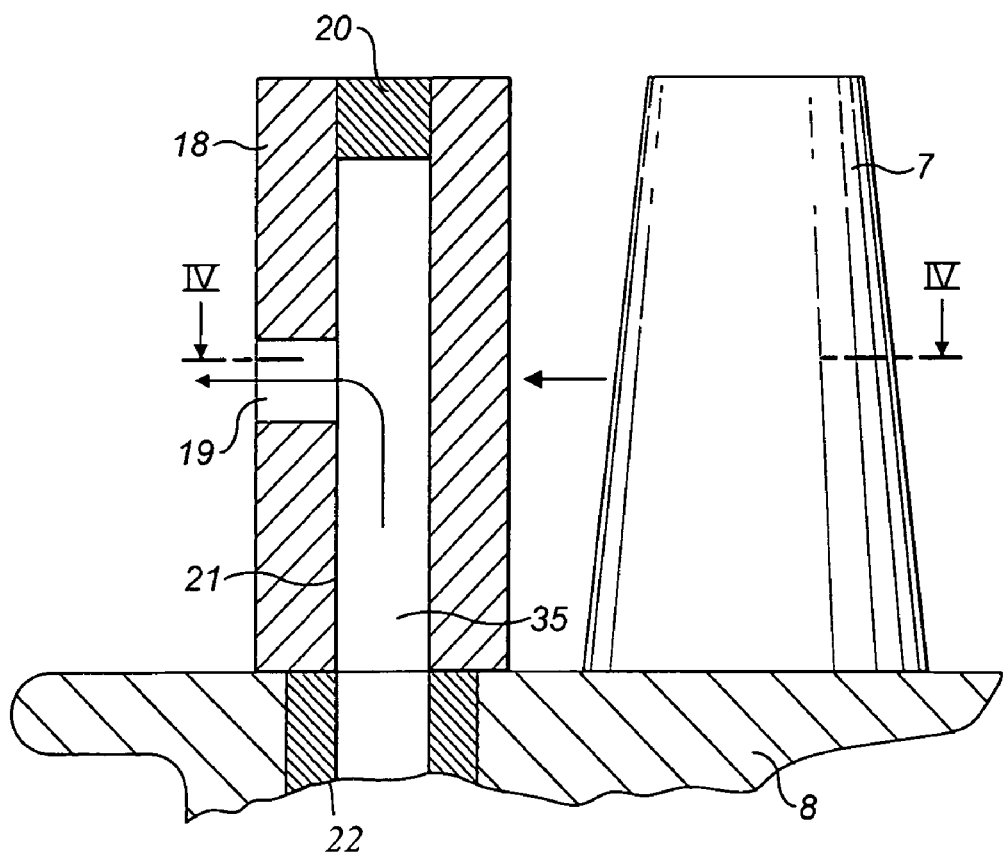
FIGS. 4a-4d—fifth and sixth embodiments of a pressure boosting means according to the present invention.
Figure 4B:
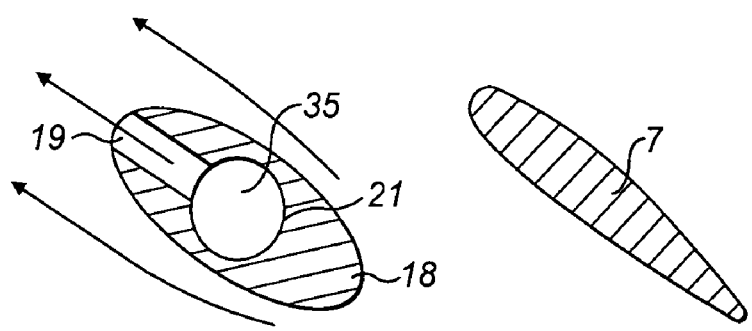

FIG. 4a shows a fifth advantageous embodiment of the present invention and FIG. 4b shows a sectional view in the arrow direction along an intersection line IV-IV in FIG. 4a. Here, on the trailing edge of the fan blade 7, there is a tubular sleeve 21 with a streamlined jacket 18 or an additional blade with a radial bore. The tubular sleeve 21 has a radial channel 35 that is closed at its upper radial end by a plug 20. An outlet opening 19 is provided on the downstream side of the streamlined jacket 18. In the present embodiment, the streamlined jacket 18 is precisely as high as the fan blades 7 and is anchored in the fan hub 8 precisely like the fan blades 7 (not shown here). Here, the approach flow comes from the hub interior (not shown here) via a bore 22. The desired increase in the absolute pressure in the interior of the generator can be set by appropriately selecting the radius on which the outlet opening 19—which is essentially configured as a bore that is parallel to the axis—is arranged. On the one hand, the arrangement selected for the embodiment according to FIGS. 4a and 4b provides a solution that has more favorable flow properties than the embodiment shown in FIG. 3. On the other hand, the distance of the outlet opening 19 from the rotor shaft, that is to say, the radius on which the outlet opening 19 is arranged, can be freely varied over the entire blade height without having a negative impact on the flow coming off the fan blades 7. A contributing factor here is the deflection of the direction of the flow coming off the streamlined jacket 18 into a flow that is parallel to the rotor axis. The fan blades 7 and the tubular sleeve 21 with the streamlined jacket 18 or the additional blades can be advantageously arranged in such a way that they enhance the main flow of the fan. This can be achieved, for instance, by an axial overlapping of the blades.

Figure 4C:
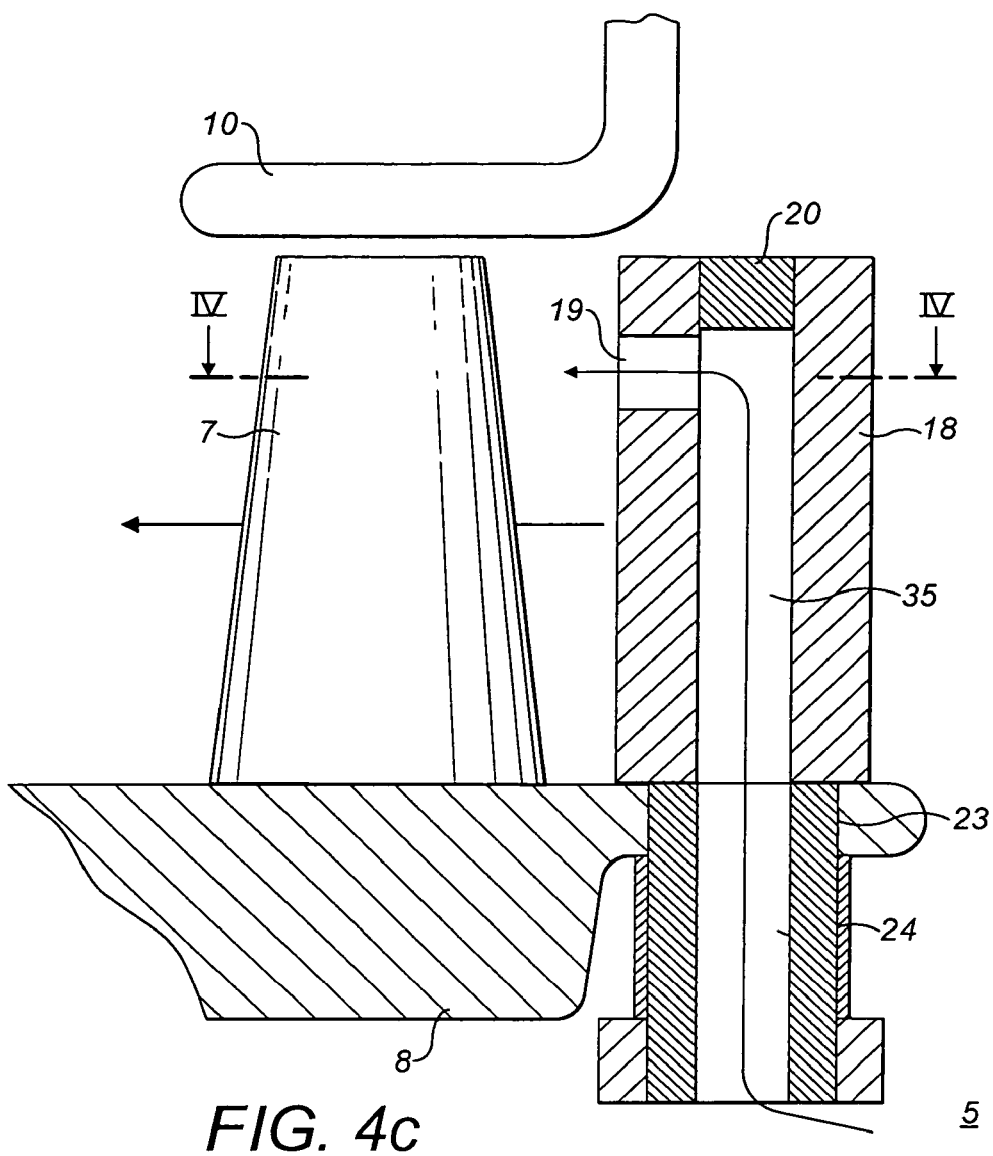
Figure 4D:
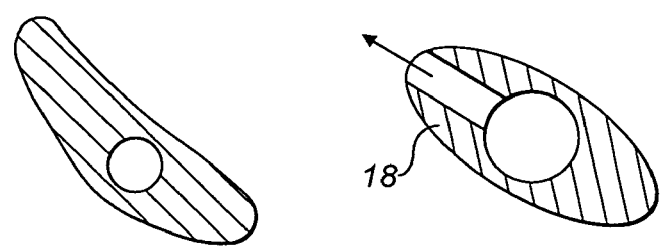

FIG. 4c shows a sixth advantageous embodiment of the present invention in which a pressure boosting means similar to the one depicted in FIG. 4a is arranged on the fan hub 8. FIG. 4d shows a sectional view along the intersection line IV-IV in FIG. 4c. In the advantageous embodiment according to FIGS. 4c and 4d, however, the tubular sleeve 21 with the streamlined jacket 18 or the additional blade with the radial bore is arranged in the flow direction upstream from the actual fan blade 7. Here, too, the approach flow comes via the hub interior 5. The tubular sleeve 21 with the streamlined jacket 18 or the additional blade is anchored on the fan hub 8 analogously to the fan blades 7, that is to say, by means of a screw thread 23. A sleeve 24 extends into the hub interior 5, as a result of which the radial differential between the cooling air inlet and the cooling air outlet is additionally increased. Moreover, here, the outlet opening 19 is also arranged on a larger radius than in the embodiment according to FIG. 4a, which brings about a higher pressure differential. Here, too, in order to optimize the flow, the fan blades 7 and the tubular sleeve 21 with the streamlined jacket 18 or the additional blade can be slightly offset tangentially and arranged so as to overlap axially.

Figure 5A:
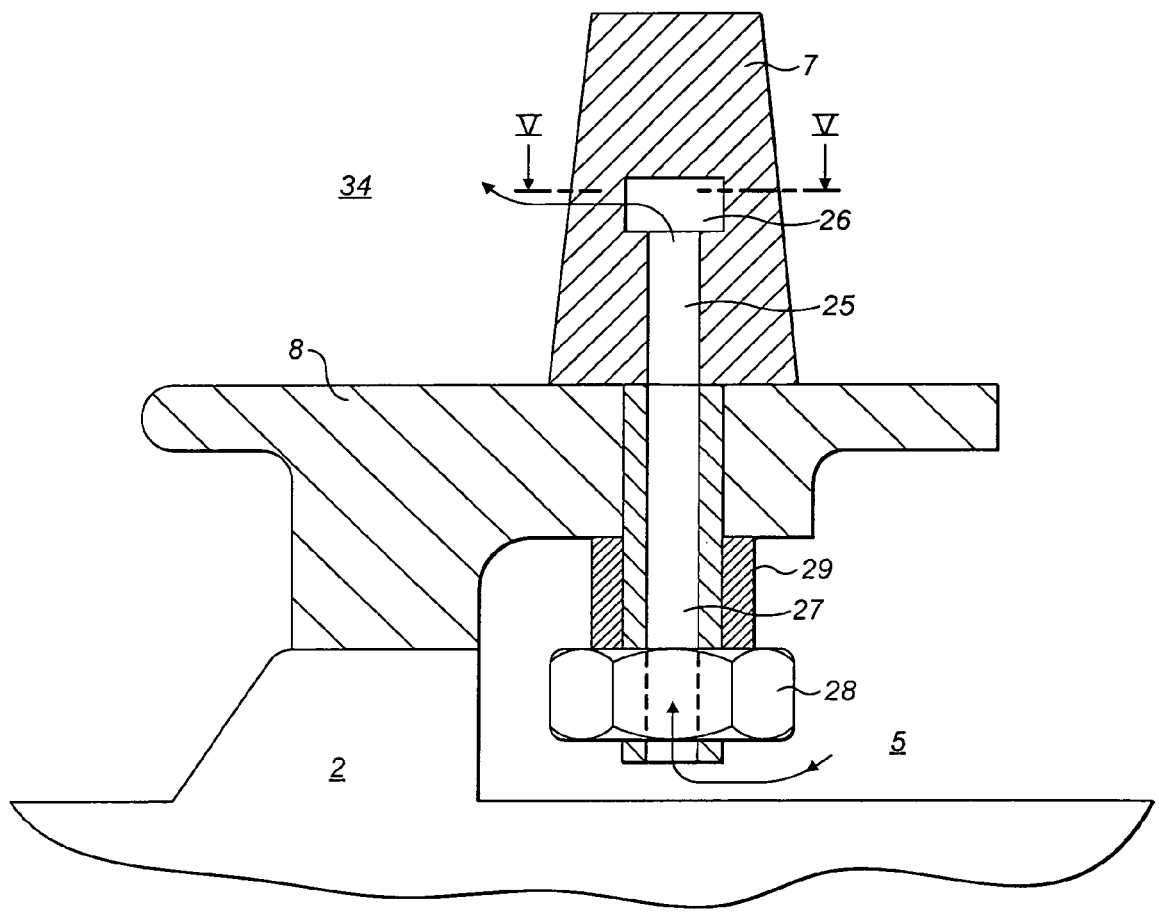
FIGS. 5a-5b—a seventh advantageous embodiment of a pressure boosting means according to the present invention.
Figure 5B:
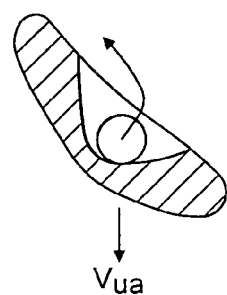

FIGS. 5a and 5b show a seventh advantageous embodiment of the present invention in which the pressure boosting means is integrated into the fan blade 7. FIG. 5b shows a sectional view along the intersection line V-V in FIG. 5a. According to this embodiment, ambient air is drawn in via a blade bore 25 configured as a radial channel, said bore being lengthened by an inlet shaft 27 in the hub interior 5, whereby the ambient air is conveyed into the generator interior 34 via an outlet opening 26 that lies on a larger radius. The inlet shaft 27 is located in the blade foot that affixes the blades 7 to the fan hub 8 by means of a spacing sleeve 29 and a screwed connection 28. The outlet opening 26 is created on a profile back of the fan blade 7 as a recess shaped like a segment of a circle so that the impact on the main flow of the fan is kept to a minimum.

Figure 6:
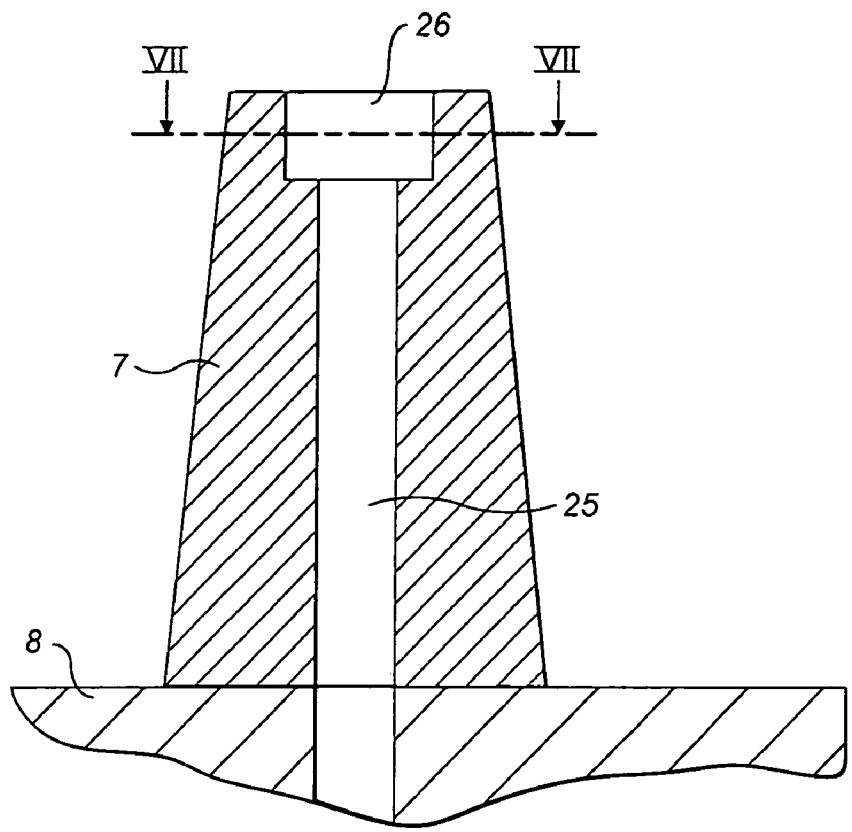
FIG. 6—an eighth advantageous embodiment of a pressure boosting means according to the present invention.
Figure 7:
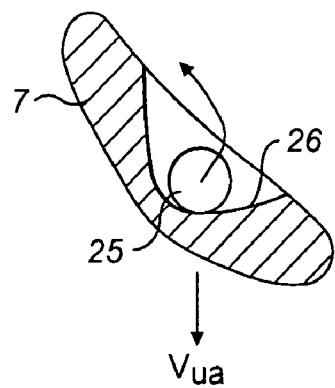
FIG. 7—a schematic sectional view of a fan blade in the arrow direction VII-VII from FIG. 6.

FIG. 6 and FIG. 7 show an eighth advantageous embodiment of the present invention, whereby FIG. 7 depicts a top view along the intersection line VII-VII from FIG. 6. In this embodiment, the pressure boosting means is likewise integrated as a blade bore 25 into the fan blade 7. The outlet opening 26 is created on the profile back of the fan blade 7 as a recess shaped like a segment of a circle at the tip of the blade so that the impact on the main flow of the fan is kept to a minimum.

Figure 8:
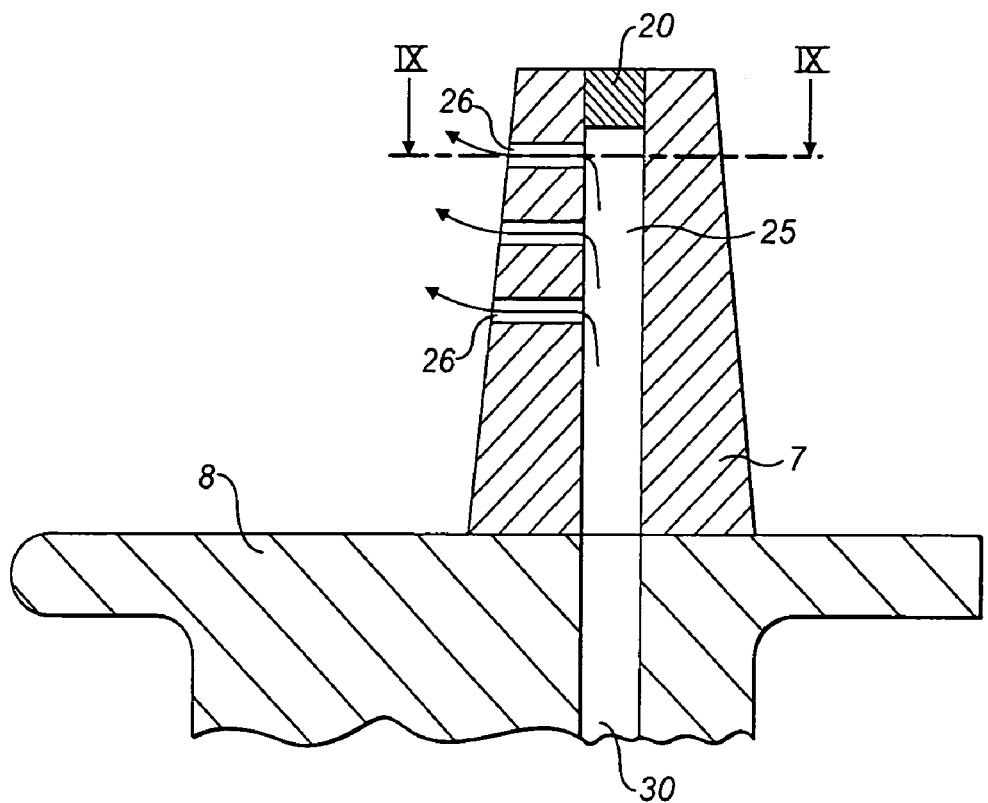
FIG. 8—a ninth advantageous embodiment of a pressure boosting means according to the present invention.
Figure 9:
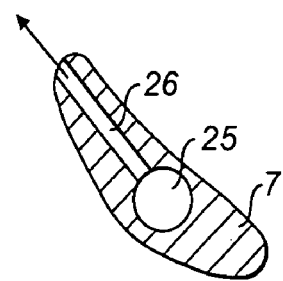
FIG. 9—a schematic sectional view of an axial fan blade in the arrow direction IX-IX from FIG. 8.

FIG. 8 and FIG. 9 show a ninth advantageous embodiment of the present invention whereby FIG. 9 depicts a sectional view along the line IX-IX from FIG. 8. The pressure boosting means is integrated into the fan blade 7 and has a radial blade bore 25 that is closed at the blade tip by a plug 20, and three outlet openings 26 that are parallel to the axis and arranged above each other. Here, too, the flow coming off the fan blades 7 is only slightly influenced by the pressure boosting means and the desired pressure increase is attained by an appropriate arrangement of the outlet openings 26. Here, too, the ambient air is drawn in through the hub interior (not shown here) via an inlet shaft 30 arranged in the fan hub 8.

Generally speaking, the arrangement of the lateral outlet opening in the streamlined jacket 18 of the tubular sleeve 21 or in the additional blade (FIGS. 4a, 4c, 5a, 5b, 6, 7) is radially sub-divided or "blurred" in a manner analogous to FIG. 8, where the radial bore has several circles milled on it above each other.

Preferably, air is generally employed as the cooling medium; the hub interior is filled with air at atmospheric pressure. However, it is also conceivable to employ other gaseous cooling media in the generator interior. Leakage medium that escapes at the gap gasket (shaft gasket 8, cover ring 31) is automatically drawn back into the generator. Therefore, medium loss is greatly reduced.

What is claimed is:

1. A gas-cooled electric machine, comprising:
   a generator housing;
   a rotor shaft;
   at least one axial fan disposed on the rotor shaft inside the generator housing and having at least one fan blade extending from a hub; and
   a pressure boosting apparatus associated with the axial fan and configured to raise an absolute pressure in a generator interior, the pressure boosting apparatus having at least one flow channel between an interior of the hub and the generator interior and being at least partially delimited by the hub, wherein a flow inlet into the flow channel in the interior of the hub and a flow outlet out of the flow channel in the generator interior at a region of the fan, are disposed radially at a distance with respect to each other.

2. The gas-cooled electric machine as recited in claim 1, wherein a radial bore in the hub forms at least a portion of the flow channel.

3. The gas-cooled electric machine as recited in claim 1, wherein a flow out of the flow channel is deflected at the flow outlet in an axial direction downstream from a main flow from the axial fan.

4. The gas-cooled electric machine as recited in claim 3, wherein the flow channel includes at least one of a diagonal channel, an L-shaped channel, a Z-shaped channel, and a double-L-shaped channel.

5. The gas-cooled electric machine as recited in claim 1, further comprising a tubular sleeve defining an extension of the flow channel.

6. The gas-cooled electric machine as recited in claim 5, wherein the tubular sleeve is configured as an additional blade of the axial fan.

7. The gas-cooled electric machine as recited in claim 5, wherein the tubular sleeve includes a streamlined jacket.

8. The gas-cooled electric machine as recited in claim 5, the tubular sleeve includes at least one outlet opening parallel to the axis and positioned along a height of the tubular sleeve.

9. The gas-cooled electric machine as recited in claim 1, wherein the axial fan includes a fan blade, the flow channel includes a radial blade bore in the fan blade and the flow outlet is formed by an outlet opening of the radial blade bore.

10. The gas-cooled electric machine as recited in claim 9, wherein the outlet opening is disposed laterally relative to the fan blade so as to allow a free flow out of the radial blade bore.

11. The gas-cooled electric machine as recited in claim 9, wherein the blade bore includes a plurality of outlet openings leading toward a trailing edge of the blade.

12. The gas-cooled electric machine as recited in claim 9, further comprising a plug disposed at a tip of the fan blade and wherein the radial blade bore is closed at the tip by the plug.

13. The gas-cooled electric machine as recited in claim 1, further comprising a further axial fan associated with a further pressure boosting apparatus and wherein the axial fan and the further axial fan are disposed at each axial end of the electric machine.

14. The gas-cooled electric machine as recited in claim 1, wherein the pressure boosting apparatus is configured to provide a pressure differential between the hub interior and the generator interior in a range from 0.1 bar to 0.5 bar.

15. The gas-cooled electric machine as recited in claim 14, wherein the pressure differential is from 0.2 bar to 0.3 bar.

16. The gas-cooled electric machine as recited in claim 1, wherein the electric machine is an air-cooled turbo-generator.

* * * * *